S. Wing.

Water and Gas Fittings.

No. 3,020. Reissued Jul. 7, 1868.

Witnesses;
Wm. Freum
Hw Lua Cl.

Inventor:
Saml Wing
per Manns & Co
Attorneys

N. PETERS, PHOTO-LITHOGRAPHER, WASHINGTON, D. C.

United States Patent Office.

CHARLES S. HALL AND CHARLES F. HALL, OF BROOKLYN, NEW YORK, ASSIGNEES, BY MESNE ASSIGNMENTS OF SAMUEL WING.

*Letters Patent No.* 49,203, *dated August* 1, 1865; *reissue No.* 3,020, *dated July* 7, 1868.

IMPROVEMENT IN REFITTING STOP-VALVES.

The Schedule referred to in these Letters Patent and making part of the same.

TO ALL WHOM IT MAY CONCERN:

Be it known that SAMUEL WING, of Monson, in the county of Hampden, and State of Massachusetts, did invent a new and Improved Portable Apparatus for Refitting Stop-Valves, Water-Cocks, &c, and we, CHARLES F. HALL and CHARLES S. HALL, of Brooklyn, in the county of Kings, and State of New York, assignees, by mesne assignment of said Samuel Wing, do hereby declare that the following is a full, clear, and exact description thereof, which will enable those skilled in the art to make and use the same, reference being had to the accompanying drawings, forming part of this specification, in which—

Similar letters of reference indicate corresponding parts.

Stop-valves, commonly known under the term of globe-valves, are usually made with conical valves secured to a screw-spindle, and fitting into a conical seat.

If a valve of this class becomes leaky, the only way to refit the same heretofore has been by regrinding, or, if that operation was insufficient, or too slow, by unscrewing the stop-valve from its connecting-pipe, and sending it to the shop, where it would be refitted in the turning-lathe, or with the proper tools.

Either of these operations causes much loss of time and of money. A simple and effective portable device, by which the operation of refitting said stop-valves can be carried out in a short time, and without disconnecting the globe from the pipes, is a desideratum which will be acceptable to everybody who is troubled with leaky valves.

The devices which form the subject-matter of this present invention, and which are intended to fill the want above pointed out, consist of two parts, one for refitting the valves, and the other for refitting the seats. The former consists of a conical concave mill, made in the form to agree with the standard form of the valves, and provided with a yielding internal centre and suitable bearings for said concave mill, in combination with an adjustable centre, also arranged in suitable bearings, in such a manner that, by removing the valve from the seat, and placing it between the adjustable and the yielding centre, it is at once in the proper position to be acted upon by the concave mill, and a few revolutions of said concave mill, imparted to it by an ordinary ratchet-brace, or any other suitable means, produces the desired effect upon the valve, and brings it in the requisite shape to fit into its seat.

The part for refitting the seats consists of a conical mill or reamer, with a cylindrical stem, to be used in combination with a guide, which is made to take the place of the stuffing-box and nut, through which the valve-spindle passes, in such a manner that, by removing said stuffing-box valve and valve-spindle, and inserting therefor the conical mill and its guide, a few revolutions given to said mill will bring the seat in proper shape, the whole operation being performed without removing the globe from its connecting-pipes, the whole constituting a cheap, simple, and effective portable apparatus.

A represents a bed-plate, cast or otherwise produced, of iron or other suitable material, and provided with two heads, *a*, which form the bearings for the stem of the concave mill B, and with another head, *b*, which forms the bearing for the adjustable centre *c*.

Figure 1:
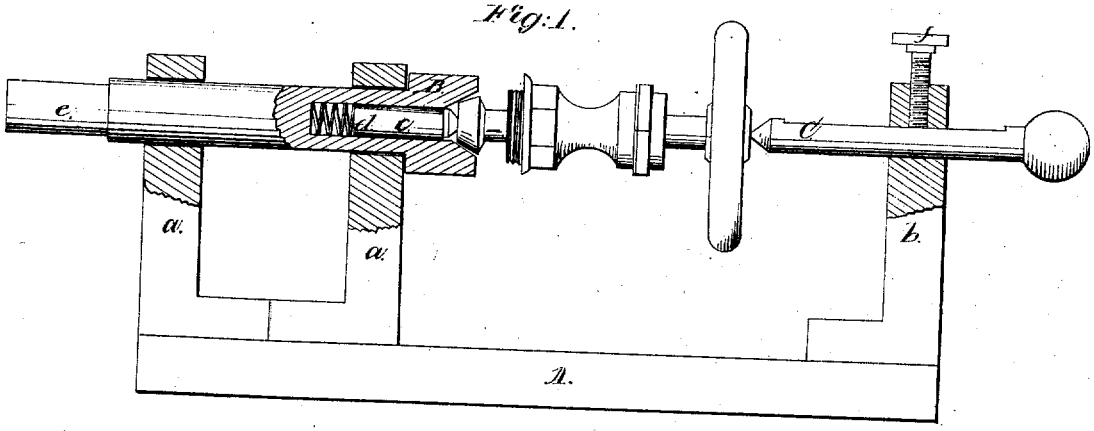
Figure 1 represents a longitudinal vertical section of the part used for refitting the valves, the line *x x*, fig. 2, indicating the plane of section.
Figure 2:
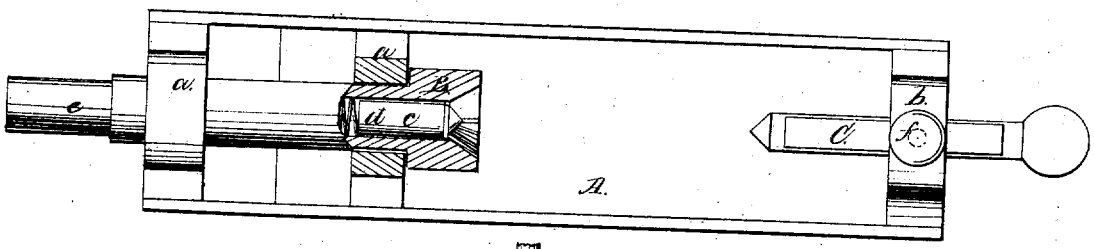
Figure 2 is a plan or top view of the same, partly in section.
Figure 3:
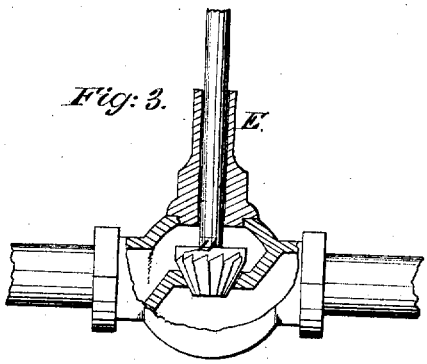
Figure 3 is a side elevation of the part used for refitting the valve-seats, showing its operation.

The concave mill B is formed to correspond reversely with the standard form of the valve, and it is provided with an internal centre, *c*, made yielding by the action of a spring, *d*, which is placed against its inner end, as clearly shown in fig. 1 of the drawing.

A square shank, *e*, at the end of the stem of said concave mill, serves to apply a crank, or other means, for imparting to the mill the desired rotary motion.

The adjustable centre C is retained in the desired position by the set-screw *f*.

The valve to be refitted is taken out of its seat, and placed between the centres C *c*, and, by imparting to the conical mill a few revolutions, pressing at the same time towards the centre C, the desired effect on the valve is produced. Although the yielding centre *c* renders the apparatus more efficient, a very good result may be obtained without it, and we contemplate, in some cases, dispensing with it.

The seat is refitted by the aid of a conical mill, D, and guide, E. When the valve, with its stuffing-box, has been removed from its seat, the mill D, with its guide E, is inserted in its place, and, by turning said mill around a few times, the seat is refitted to the desired shape.

The mills B and D are necessarily made of steel, and suitably hardened, and serve for all sizes of valves, the conical inclination of the latter being always the same, without respect to size.

The guide E is made of iron or brass, and provided with a screw-thread to screw into the shell of the valve, in the place of the stuffing-box, which forms the guide of the valve-spindle, and may be made in the form shown in the drawings, or it may be provided with means for adjusting the stem of the milling-tool D radially, as, for instance, by the provision of radial set-screws or wedges, or other similar means may be made use of for the purpose.

The entire apparatus is very simple, and by its aid the stop-valve can be fitted, with little loss of time, and without removing the globes of said valves from their connecting-pipes, and may be readily carried from place to place where the defective valves are to be found.

Having thus described this invention, we claim as new, and desire to secure by Letters Patent—

1. The concave mill B, either provided with or not an internal yielding centre, *c*, and arranged in suitable bearings *a*, in combination with the adjustable centre C, constructed and operating substantially as and for the purpose set forth.

2. The guide E and conical mill D, applied in combination with each other, substantially as and for the purpose described.

3. An improved portable apparatus, constructed substantially as herein described, for refitting the valves and valve-seats of stop-valves and water-cocks.

The above specification of our reissue signed by us this 2d day of April, 1868.

C. S. HALL,
C. F. HALL.

Witnesses:
WM. F. MCNAMARA,
ALEX. F. ROBERTS.